Jan. 26, 1971     J. E. BULLEN     3,557,494
MACHINE TOOL
Filed June 11, 1968     3 Sheets-Sheet 1
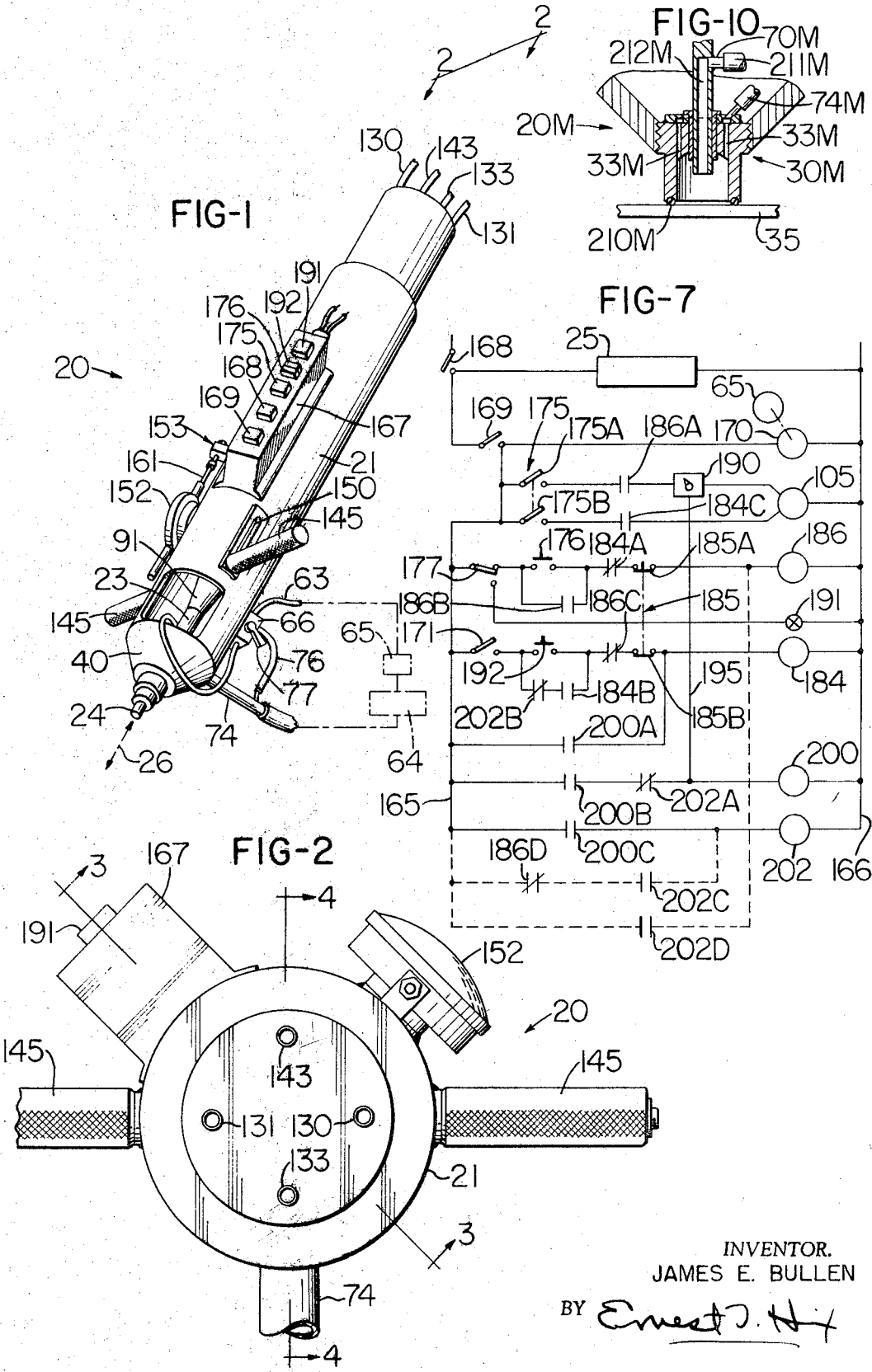
INVENTOR.
JAMES E. BULLEN
BY Ernest J. H.
HIS ATTORNEY

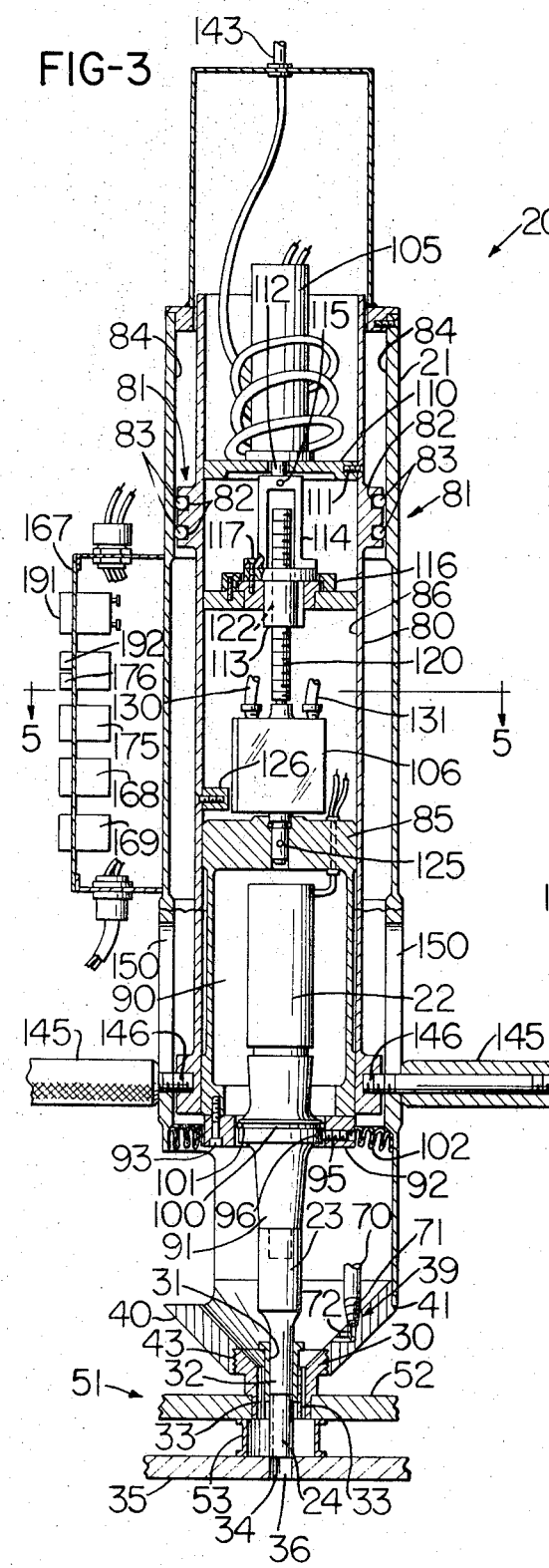
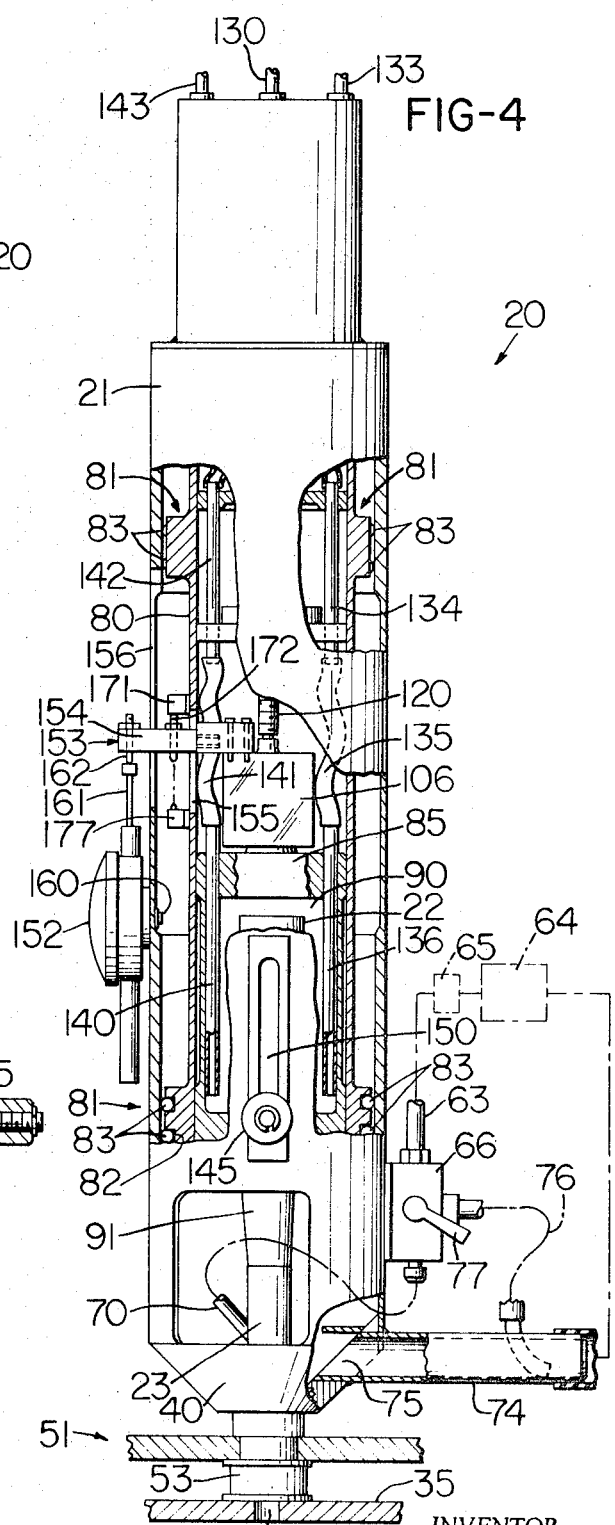

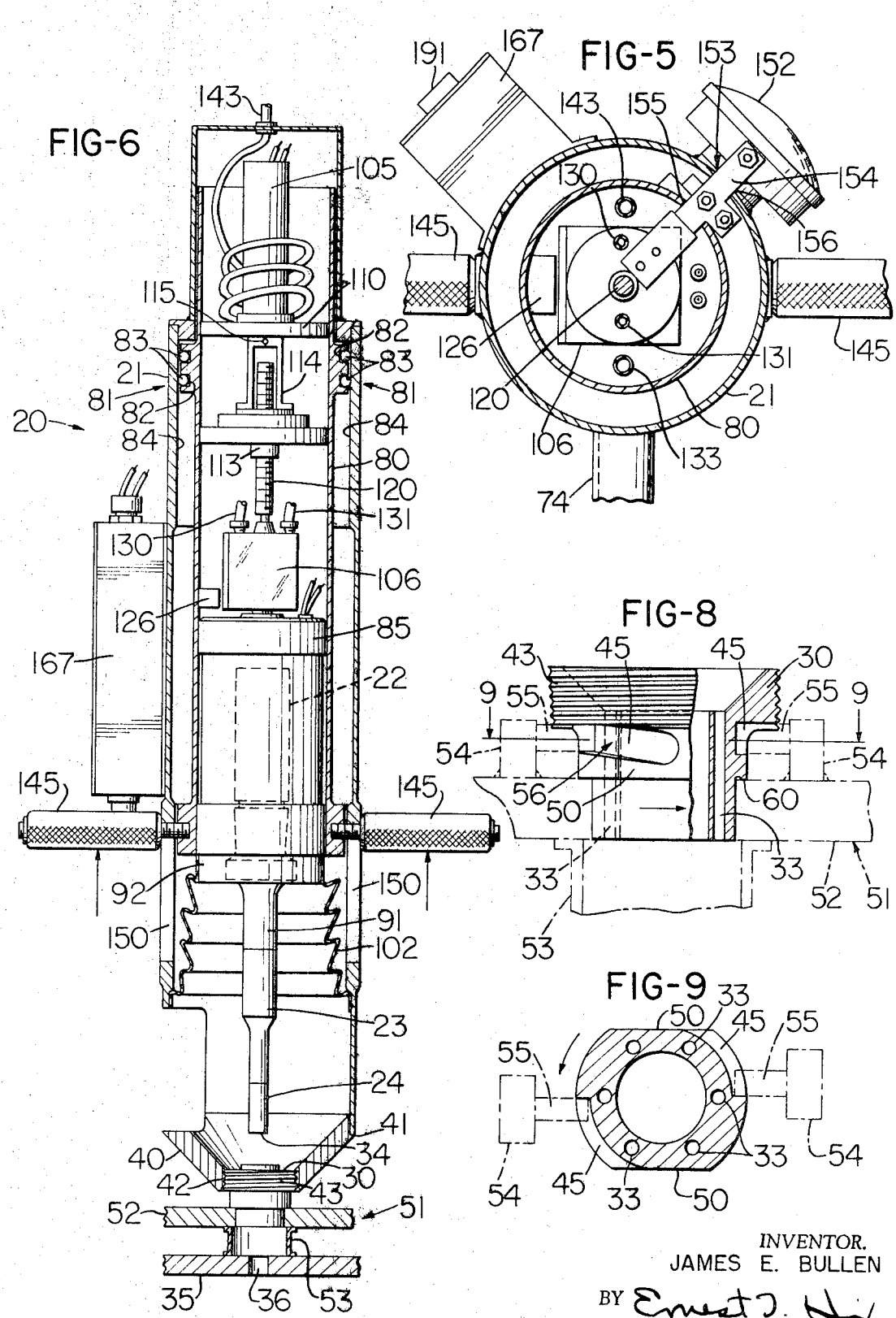

United States Patent Office 3,557,494
Patented Jan. 26, 1971

3,557,494
MACHINE TOOL
James E. Bullen, Eaton, Ohio, assignor to The Bendix Corporation, a corporation of Delaware
Filed June 11, 1968, Ser. No. 736,121
Int. Cl. B24b 7/00, 9/00, 57/00
U.S. Cl. 51—59                            21 Claims

ABSTRACT OF THE DISCLOSURE

A hand-portable forming apparatus which uses high frequency oscillators of a forming tool and a recirculating abrasive slurry.

BACKGROUND OF THE INVENTION

Many machines have been proposed heretofore which use forming tools driven at ultrasonic frequencies together with associated abrasive slurries to form various types of workpieces and such machines are often referred to as ultrasonic machines. Each of the previously proposed ultrasonic machines is usually a massive structure which is supported at a fixed position and requires that a workpiece to be formed be carried to the machine for forming.

However, in many applications the workpiece to be formed may comprise a structure which, for numerous reasons, cannot be moved to the fixed ultrasonic machine for forming thereby requiring that the ultrasonic machine be readily portable and useable at a plurality of locations and in a similar manner as a hand drill, for example. However, because of the comparative complexity of the previously proposed ultrasonic machines it has heretofore not been feasible to produce a lightweight hand-portable ultrasonic forming machine or apparatus which is capable of being operated efficiently.

SUMMARY

This invention provides a hand-portable apparatus which uses high frequency oscillations of a forming tool and a recirculating abrasive slurry to form an associated workpiece. Further, the apparatus of this invention is of light weight and easily handled by one operator and includes means assuring efficient feeding of the forming tool into an associated workpiece.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show exemplary embodiments of this invention, in which FIG. 1 is a perspective view illustrating one embodiment of the hand-portable apparatus of this invention;

FIG. 2 is a view with parts broken away essentially on the line 2—2 of FIG. 1;

FIG. 3 is a view with parts in section and parts broken away taken essentially on the line 3—3 of FIG. 2;

FIG. 4 is a view with parts in section and parts broken away taken on the line 4—4 of FIG. 2;

FIG. 5 is a cross-sectional view with parts broken away taken on the line 5—5 of FIG. 3;

FIG. 6 is a view roughly similar to the view illustrated in FIG. 3 and showing a pair of handles comprising the apparatus of FIG. 1 moved upwardly to move the forming tool away from an associated workpiece prior to twisting of such handles and apparatus to remove the apparatus from an associated locating fixture used in association with the workpiece;

FIG. 7 illustrates an exemplary electric circuit for the apparatus of FIG. 1;

FIG. 8 is a view of a device comprising the lower end portion of the apparatus of FIG. 1 illustrating the manner of fastening such device and hence the apparatus in position in an associated fixture, shown by dotted lines, to enable forming the associated workpiece;

FIG. 9 is a view taken on the line 9—9 of FIG. 8; and

FIG. 10 is a fragmentary cross-sectional view illustrating another exemplary embodiment of the apparatus of this invention which has a modified device comprising its lower end portion.

DESCRIPTION OF ILLUSTRATED EMBODIMENT

Reference is now made to FIG. 1 of the drawings wherein one exemplary embodiment of a hand-portable forming apparatus of this invention is illustrated in perspective view and designated generally by the reference numeral 20. The apparatus 20 has an outer housing 21 which supports a magnetostrictive driving transducer 22 therewithin and in a manner to be subsequently described. A toolholder 23 is fixed to the lower end portion of the transducer 22 and the toolholder 23 has a forming tool 24 suitably fastened to its lower end.

The transducer 22 is operatively connected to an electronic generator 25 (see FIG. 7) of known construction which converts normal AC power into high frequency power which the transducer 22 converts to high frequency mechanical oscillations of minute amplitudes to thereby oscillate the forming tool 24 in a corresponding manner substantially along the central axis 26 of the apparatus 20.

As seen particularly in FIGS. 3 and 8, the apparatus 20 has a device which will be referred to as a guide 30 fixed to the lower end portion of the housing 21 and the guide 30 has an opening 31 provided therein for receiving and guiding the lower end portion 32 of the toolholder 23 for axial telescoping movement therethrough. The guide 30 also has aperture means shown as a plurality of apertures 33 extending therethrough approximately parallel to the central axis of the forming tool 24 which in this example of the invention coincides with the central axis 26 of the apparatus 20. The apertures 33 are adapted to convey an abrasive slurry (used in association with the apparatus 20) toward and away from the operating end 34 of the forming tool 24 whereupon as the apparatus 20 is held in position so that the forming tool 24 is brought into engagement with a workpiece 35 which is to be formed, the forming tool 24 drives the abrasive grains contained in the slurry into the workpiece and enables forming thereof. In this example of the invention the forming action comprises cutting a hole 36 in the workpiece 35.

The abrasive slurry used in association with the apparatus 20 is formed by suspending suitable abrasive grains in a liquid solution in a known manner; therefore, a more detailed presentation will not be made of the abrasive slurry. Further, the abrasive slurry is conveyed toward and away from the apparatus 20 in a simple and efficient recirculating manner and without spillage while enabling movement of the hand-portable apparatus 20 for use at spaced locations along a comparatively large workpiece, such as along the wings and fuselage of an aircraft, for example.

The housing 21 of the apparatus 20 is a substantially tubular housing of right circular cylindrical configuration and has a cup-like lower end portion, which in this example of the invention is defined by a frustoconical member 40, which is suitably fixed to the housing 21, as by welding, indicated at 41. The member 40 has female threads 42 provided in its small diameter lower end portion and the guide 30 is fixed to the member 40 by utilizing cooperating threads 43 provided in the guide 30 to threadedly fasten the guide 30 in position so that the major portion thereof extends outwardly of, beneath (as seen in FIG. 3) the frustoconical member 40.

The cup-like frustoconical member 40 serves as a reservoir for the abrasive slurry and at some locations in this specification the member 40 may also be referred to as reservoir 40 for ease of description. The slurry is fed from the reservoir 40 through the apertures 33 of the guide 30 to the operating end 34 of the forming tool 24. The manner in which the abrasive slurry is conveyed to the cup-like member or reservoir 40, through the apertures 33 of guide 30, to the operating or forming end 34 of the forming tool 24, and away from such operating end and hence apparatus 20 will be described in detail subsequently.

As seen particularly in FIGS. 6, 8, and 9, the exemplary apparatus 20 is illustrated as being moved and arranged in a substantially vertical position above the workpiece 35, through which the hole 36 is to be formed, i.e., drilled. However, it will be appreciated that the apparatus 20 may be effectively operated with its axis 26 positioned substantially horizontally, or at any intermediate position between a vertical and horizontal position.

The guide 30 has a pair of grooves 45 provided therein and arranged at substantially diametrically opposed positions. The guide 30 also has a pair of diametrically opposed flattened surfaces 50 and the manner in which the grooves 45 and flattened surfaces 50 are utilized to fasten the apparatus 20 in position to enable forming the workpiece 35 will now be described.

The apparatus 20 of this example is used with an associated fixture 51 and the fixture 51 has a plate-like portion 52 with a substantially tubular extension 53 extending therebeneath and fastened in sealed relation to the plate 52. The tubular portion 53 is held in position against the workpiece 35 in a sealed manner so that it surrounds the location at which the opening 36 is to be formed so that abrasive slurry introduced in the reservoir 40 may travel through the guide 30 and flood that portion of the workpiece 35 surrounded by the tubular extension 53 without loss of such abrasive slurry.

The fixture 51 also has a pair of upwardly extending arms 54 suitably fixed thereto with a pin 55 extending from each arm 54 so that the pins 55 extend from arms 54 and toward each other in the manner illustrated in FIGS. 8 and 9. Each of the grooves 45 provided in the guide 30 has an angled confiuration, as illustrated at 56 in FIG. 8, and the guide 30 and hence apparatus 20 is supported in a position for forming the hole 36 in the workpiece 35 merely by inserting the lower end portion of the apparatus 20 into position between the pins 55 and initially with the flattened surfaces 50 arranged substantially perpendicular to the pins 55. Upon rotating the apparatus 20 the terminal end of each pin 55 is received within an associated groove 45 whereupon the apparatus 20 is fastened firmly in position against the fixture 51 and held so that a tight seal is provided between an annular shoulder 60 provided on the guide 30 and the top surface of the plate 52 to thereby further assure that abrasive slurry will not be lost during the forming or cutting action of the forming tool 24.

The apparatus 20 has suitable conveying means for supplying the abrasive slurry to the cup-like reservoir 40 comprising its lower end and for conveying such abrasive slurry away from such reservoir without spilling thereof. Referring now to FIGS. 1 and 3 of the drawings, it will be seen that the apparatus 20 has an easily movable supply conduit 63 for supplying the abrasive slurry under pressure from a supply source, shown in this example as a supply tank 64. A pump 65 is utilized for pumping the abrasive slurry at a controlled pressure from the tank 64 through the line 63.

A selector valve 66 is operatively connected in the supply conduit 63 and such selector valve is mounted on the housing 21 at a location where it is easily accessible to an operator using the apparatus 20. The supply conduit 63 has a downstream portion 70 which is arranged downstream of the selector valve 66 and the downstream portion 70 in this example of the invention is in the form of an external conduit portion which has a terminal end 71 threadedly fastened to the member or reservoir 40 as shown at 39 and the terminal end 71 is in flow communication with an internal passage 72 which enables the abrasive slurry to be introduced in the reservoir 40. However, it will be appreciated that the downstream portion 70 may be provided as an internal passage from the selector valve 66 through the outer housing 21 and through member 40.

As seen particularly in FIG. 4 of the drawings, the apparatus 20 is provided with a return conduit 74 which has an inlet 75 arranged in flow communication with the reservoir 40 and its discharge end communicating with the supply tank 64. The return conduit 74 returns the abrasive slurry from the reservoir 40 to the supply tank 64 after such slurry has flowed past the operating end 34 of the forming tool 24. In those applications where the workpiece 35 is located at positions above the supply tank 64, the return line 74 may be made of a sufficiently large cross-sectional area to enable the slurry to be returned to the supply tank 64 by gravity flow. Also, it will be appreciated that the return conduit 74 may be operatively connected to a suitable vacuum pump arranged upstream of the supply tank 64 to assure return of the abrasive slurry to the supply tank irrespective of the relative positions of the apparatus 20 and supply tank 64 and the attitude of the apparatus 20 relative to the workpiece 35.

The apparatus 20 has a bypass conduit 76 operatively connected between the selector valve 66 and the return conduit 74. The bypass conduit 76 is used to return abrasive slurry to the supply source, i.e., the supply tank 64, without requiring that the pump 65 be stopped. Thus, during those instances wherein the forming action of the apparatus 20 is stopped, the abrasive slurry may be continuously pumped by the pump 65 through the line 63 to the selector valve 66 and easily bypassed by actuating a lever 77 provided on the selector valve 66 so that such slurry flows through the bypass conduit 76 to the return conduit 74 and back to the tank 64. This feature makes it possible for the abrasive slurry to be substantially instantly available to the operating end 34 of the forming tool 24 merely by actuating the lever 77 of the selector valve 66 and without requiring that the forming tool 24 remain inoperative until such slurry is available to the operating end 34 as would otherwise be required if the bypass feature were not incorporated in the apparatus 20. It will be appreciated that this feature assures that the apparatus 20 may be operated in a more efficient manner.

The conveying means described above thus conveys abrasive slurry under pressure from a supply source, i.e., supply tank 64, to the reservoir 40, whereupon the slurry flows through certain ones of the apertures 33 in the guide 30 and floods the area of the workpiece 35 defined by tubular portion 53 of the fixture 51. The forming tool 24 oscillates at ultrasonic frequencies in the manner previously described and drives abrasive grains suspended in the slurry into the workpiece 35 to form the opening 36. The abrasive slurry is then returned through the apertures 33 and return conduit 74 to the supply tank 64 whereby there is substantially no loss of abrasive slurry, as previously mentioned, and the forming action is continued in an efficient manner. Obviously, in those applications wherein the opening 36 is drilled completely through the workpiece there may be a small loss of slurry through the drilled opening but this may be kept to a minimum by immediate actuation of the bypass lever 77.

Referring now particularly to FIG. 3 of the drawings, it will be seen that the apparatus 20 has a cylindrical sleeve 80 which is supported for axial movement within the outer housing 21 by a plurality of ball bearing assemblies 81. Each ball bearing assembly 81 comprises a plurality of supporting recesses or grooves 82 each provided in an extension portion of the sleeve 80 and each carrying a ball bearing 83. The ball bearings 83 of each assembly 81 are free to rotate within their grooves 82 and have their outer portions received within a cooperating rectilinear and axially aligned groove 84 provided in an increased thickness portion of the outer housing 21, whereby the sleeve 80 is free to move in a substantially frictionless manner and axially within the outer housing 21 by the ball bearings 83 rotating within their associated grooves 82 and along the rectilinear grooves 84 provided in the outer housing 21.

A carrier 85 is also provided and slidably supported for axial sliding movement within the cylindrical surface 86 of the sleeve 80. The carrier 85 has a central fluid-receiving chamber indicated at 90, and it will be seen that the transducer 22 is mounted within the chamber 90 with a portion thereof indicated at 91 extending outwardly therefrom while providing a tight seal between the outer portion 91 of transducer 22 and the chamber 90 of the carrier 85 and in a manner now to be described.

The transducer 22 is suitably suported in a substantially suspended manner at the lower end of the carrier 85 by a ring 92 fastened to the carrier 85 by bolts 93 and a plurality of set screws 95 extend through the ring 92 into engagement with cooperating substantially conical support surfaces 96 provided in the transducer 22 whereby the transducer is supported essentially by structural members which are brought into engagement therewith essentially in one common plane. The transducer 22 also has an annular groove 100 provided therein and an O ring seal 101 is provided within the groove 100 and cooperates with the inside cylindrical surface of the ring 92 to provide the above-mentioned tight seal between the chamber 90 and the outside of the apparatus 20.

A flexible boot 102 is also provided in the lower end portion of the apparatus 20 and the boot is fastened to the outer housing 21 and to the ring 92. The boot 102 enables movement of the carrier 85 and sleeve 80 with respect to the terminal outer end of the housing 21 in the manner illustrated in FIG. 6.

Feed means is provided for urging the carrier 85 and hence the transducer 22, toolholder 23, and forming tool 24 outwardly from within the sleeve 80 in a telescoping manner and hence outwardly from the outer housing 21 toward the workpiece 35. The feed means in this example of the invention is shown in the form of a reversible electric motor 105 which is operatively connected to the carrier 85 to enable urging of such carrier and forming tool outwardly from the apparatus 20. However, it is to be appreciated that the feed means may be any suitable means which would be effective in urging the transducer 22 and forming tool 24 outwardly. In particular, in one exemplary embodiment of this invention the feed means comprised a mechanical compression spring which acted between the sleeve 80 and the carrier 85 to urge the forming tool 24 outwardly against a workpiece to be formed or drilled.

The motor 105 is effective in moving the carrier 85 and hence the forming tool 24 outwardly against the workpiece 35 in a manner which will be described in detail subsequently; however, the exemplary apparatus 20 also has means for moving the carrier 85 and hence the transducer 22 and its forming tool 24 about a central axis through the toolholder 23 and coinciding with the axis 26. In this example of the invention such moving means comprises a rotary actuator 106 which is in the form of a pneumatic actuator which oscillates the carrier 85, transducer 22, and hence forming tool 24 through a predetermined arc while the motor 105 extends such transducer out outwardly to urge the forming tool 24 against the workpiece 35 to provide a more efficient forming action.

The motor 105 is suitably fastened to a bracket 110 which is in turn fastened to the sleeve 80 by a plurality of screws 111. The motor has a shaft 112 extending therefrom and a first threaded member shown in the form of a nut 113 is fixed to the shaft 112 through a yoke-shaped member 114 which has its upper end fixed to the shaft 112 by a pin 115 and its lower end fastened to the nut 113 by screws 117. Thus, it is seen that the nut 113 is adapted to rotate with the shaft 112 upon rotation thereof by the motor 105. The nut 113 has a disc-like guide assembly 116 suitably fastened thereto and upon rotation of the shaft 112 it will be seen that the nut 113 and the entire assembly 116 is also rotated within the sleeve 80 with the assembly 116 assuring that the rotation is maintained about a fixed axis.

A second threaded member in the form of a threaded bolt 120 is operatively connected to the carrier 85. The upper end of the threaded bolt 120 is received within a cooperating threaded opening 122 provided in the nut 113 so that upon rotating the shaft 112 it will be seen that the nut 113 is simultaneously rotated and with the threaded bolt 120 engaging threads 122 of the nut 113 the effect of rotating the shaft 112 is to move the carrier 85 toward and away from the motor 105 and thereby extended the forming tool 24 toward and away from the workpiece 35.

As previously described, the rotary actuator 106 is supported in position and has its lower end fixed to the carrier 85 by a pin 125. A stop 126 is provided and fixed to the outer housing 21 and the stop is effective to prevent complete rotation of the rotary actuator 106. The rotary actuator 106 is of known construction and therefore will not be described in detail. One example of an air operated actuator which has been used successfully is sold under the name of Rotac and is manufactured by the Ex-Cell-O Corporation, 945 E. Sater St., Greenville, Ohio. The operation of the actuator 106 is such that as the motor 105 is energized to extend the bolt 120 the actuator 106 oscillates the carrier 85 about the axis 26. The stop 126 is used in a known manner to prevent complete rotation of the actuator 106 as the threaded bolt 120 and the rotary actuator carried thereby is extended by the motor 105. This feeding action assures that the operating end 34 of the forming tool 24 is urged by the motor 105 firmly against workpiece 35 while simultaneously a rotary oscillation is provided to assure that the forming tool 24 may be urged at maximum speed into the workpiece 35 and with minimum likelihood of jamming.

The rotary actuator 106 of this example is supplied with air under pressure from a suitable source. A pair of air lines 130 and 131 are provided to convey the air to the actuator 106 and away therefrom in a known manner.

Means is provided for cooling the transducer 22 during operation thereof and comprises a flexible fluid supply line 133 which is fastened in flow communication with a suitable coolant source and enters the upper end portion, as viewed in FIG. 4, of the apparatus 20 and the cooling fluid in this example is in the form of a cooling liquid. The cooling liquid is conveyed within the apparatus 20 by the terminal end portion of the flexible supply line and by a series of suitably interconnected conduit sections 134, 135, and 136. The conduit section 135 is a flexible section 135 and is fastened to section 136 which is rigid and extends is sealed relation through the top portion of the carrier 85 into the chamber 90. The flexible section 135 enables the carrier 85 to be moved axially within the sleeve 80 while enabling unobstructed oscillation thereof by the rotary actuator 106.

The cooling liquid is conveyed away from the chamber 90 and the apparatus 20 by a series of suitably interconnected conduit sections 140, 141, and 142 which are fastened to a flexible return line 143 which returns the liquid coolant to the coolant source. The conduit section 140 is a rigid section and extends through the top portion of the carrier 85 in a sealed manner and is fastened in flow communication with section 141 which is flexible to allow free movements of the carrier 85 within the sleeve 80 in a similar manner as allowed by the conduit section 135.

Thus, the cooling liquid is conveyed to the apparatus 20 through the flexible supply line 133 and through associated internal conduit sections to the chamber 90 so that it surrounds and cools the transducer 22. The cooling liquid is conveyed from the chamber 90 through associated internal conduit sections which communicate with the flexible return line 143.

It will be noted from the drawings that the flexible lines 133 and 143 are fastened to the outer housing 21 and the line 133 and 143 have coiled portions carried within the housing 21 which allow free movement of the sleeve 80 relative to such housing.

Suitable pump means is provided for supplying the cooling liquid from the coolant source or tank to the supply line 133, flowing it through such line under pressure to the apparatus 20, and returning the cooling liquid to such tank; and, inasmuch as the tank and pump means may be of known construction they will not be described in detail.

The hand-portable apparatus 20 has a pair of handles each designated by the reference numeral 145 and each handle is threadedly fastened to the sleeve 80 as shown at 146. The outer housing 21 of the apparatus 20 has a pair of elongated slots 150 and the slots are adapted to allow free telescoping movement of the sleeve 80 and the handles 145 with respect to the outer housing 21. Initially the apparatus 20 is fastened in position against an associated holding fixture 51 provided in association with the workpiece 35 to be formed, and during this fastening action the handles 145 are moved upwardly and the forming tool 24 is retracted within the outer housing 21 as seen in FIG. 6. Once the apparatus 20 is fastened in position against the fixture 51, in the manner previously described in detail, the handles are lowered and the operating end of the forming tool 24 is brought into contact with the workpiece 35 to commence the forming or cutting action.

As seen particularly in FIG. 4 of the drawings the apparatus 20 has an indicator shown as a dial indicator 152 which is used to indicate the amount that the forming tool 24 is extended into the workpiece 35 after commencement of the forming action. A bracket 153 is provided and has its inner end fastened to the rotary actuator 106 and its outer end portion 154 extending through a pair of radially aligned slots 155 and 156 provided in the sleeve 80 and outer housing 21 respectively so that upon movement of the forming tool 24 (i.e., movement of carrier 85 and actuator 106, because the forming tool 24 is fixed to the carrier 85) the bracket 153 will move with respect to the outer housing 21. The indicator 152 is fixed to the outer housing as shown at 160 and has a plunger 161 which is normally urged outwardly therefrom. The plunger 161 has its terminal end engaged by the plunger contact 162 fixed to the outer end portion 154 of the bracket 153. As the actuator 106, carrier 85, and hence the forming tool 24 move outwardly into the workpiece 35 the bracket 153 also moves and pushes the plunger 161 within the indicator 152 to indicate the amount of movement. It is a simple matter for an operator to adjust or read the initial position of the indicator 152 upon commencement of the cutting action as well as observe such indicator during the forming action so that once the desired depth of cut has been achieved the apparatus 20 may be stopped.

Reference is now made to FIGS. 1, 3, 4, and 7 of the drawings for a detailed presentation of an electrical control means used to control the feed means and hence the action of the forming tool 24 as it operates on the workpiece 35 to assure an efficient forming action. The apparatus 20 utilizes an electrical system indicated in FIG. 7 which comprises a pair of electrical lines 165 and 166 and the previously mentioned high frequency generator 25 is suitably electrically connected in the system between the lines 165 and 166. The apparatus 20 has a control panel 167 suitably provided thereon adjacent the handles 145 and the panel 167 is readily visible and accessible to an operator of the apparatus 20. A switch shown in the form of a control button 168 is provided on the panel 167 and supplies power to the apparatus 20. Another switch in the form of a control button 169 is provided on the panel 167 and the button 169 is actuated to energize a motor 170 and start the pump 65 which provides abrasive slurry to the apparatus 20.

The circuit illustrated in FIG. 7 shows the transducer 22 ready for forward feed and with a limit switch 171 open. As the infeed starts an actuating member 172 carried by the bracket 153 moves away from the limit switch 171, see FIGS. 4 and 7, and closes such switch.

A control button 175 on the control panel 167 is actuated to move a pair of arms 175A and 175B in simultaneous manner and place the circuit in condition for forward feed once a forward feed button 176 on the panel 167 is actuated.

To start advancing movement of the forming tool 24 the button 176 is actuated which completes a circuit through a normally closed limit switch 177 and normally closed contacts 184A of a control relay 184 and through the contacts 185A of an emergency stop switch to energize a control relay 186.

Energizing the control relay 186 causes its normally open contacts 186A to close and thereby supply power through an adjustable precision electrical device 190 to the feed motor 105 to energize such motor and start rotation thereof for advancing movement of the forming tool 24. The motor 105 continues to rotate its shaft 112 and nut 113 so as to extend the carrier 85 with respect to the inner sleeve 80 whereby the forming tool 24 is advanced into the workpiece 35. Actuating the control relay 186 also simultaneously closes its normally open contacts 186B to complete a holding circuit to the relay 186 causing the infeed to remain actuated until the forming tool 24 has reached the desired depth.

Once the forming tool 24 reaches the desired depth in the workpiece 35 the lower end of the actuating member 172 actuates limit switch 177 thereby deenergizing the control relay 186 whereupon its normally open contacts 186A are again opened to stop the motor 105. Simultaneously a travel limit light 191 is also energized to indicate that the proper depth has been reached by the forming tool 24.

In this example of the invention the retract from full infeed travel is shown as being achieved manually, as will now be described. To retract the forming tool 24 a push button 192 is actuated to complete a circuit through normally closed contacts 186C of the control relay 186 to energize the control relay 184, whereby its normally open contacts 184B are closed by the relay 184 to complete a holding circuit, through normally closed contacts 202B of a timer 202 to be later described, and keep the relay 184 energized. Simultaneously therewith the normally closed contacts 184A of relay 184 are opened to assure that the control relay 186 is kept deenergized. Further, energizing the control relay 184 causes its normally open contacts 184C to close and complete a circuit to the motor 105. However, the circuit in this instance is provided through suitable motor leads which cause the motor 105 to reverse its direction of rotation thereby reversing the rotation of its shaft 112, whereupon the carrier 85 and the forming tool 24 are retracted, i.e., moved away from the workpiece 35. Once the fully retracted position has been reached the limit switch 171 is again opened, thereby deenergizing the control relay 184, whereuopn the circuit is now in condition to start advancing movement of the forming tool 24 in the manner previously described.

In this exemplary embodiment of the invention the retraction of the forming tool 24 from within the workpiece 35 is shown as being achieved by manual actuation of the retract button 192. However, it will be appreciated that such retraction could be achieved automatically by providing suitable electrical components in the electrical circuit so that once the desired depth has been reached and the travel limit light 191 is actuated, action would be taken to automatically reverse the direction of rotation of the motor 105 and retract the forming tool 24.

The apparatus 20 has unique control means comprising its electrical control system for controlling the motor 105 and the feeding of the forming tool 24 into the workpiece. Means is also provided for controlling the rate of feed of the forming tool 24 into the workpiece 35 so that if the forming tool 24 is being fed too fast into the workpiece 35 the advancing movement thereof may be stopped and the tool retracted a predetermined amount whereupon the forming action is commenced again in a semiautomatic manner to thereby assure a more efficient and smooth operation. It will be appreciated that in forming, i.e., drilling, for example, of very hard workpieces, if the forming tool 24 is fed into the workpiece too fast there will be a tendency for the tool to jam which not only causes operating delays but also may cause damage to the equipment.

The previously mentioned electrical device 190 senses an electrical condition such as electrical current flow, for example, which indicates the tendency of the forming tool 24 to jam. The device 190 is connected by a lead 195 to a differential current relay 200 and once the high current condition is created by jamming of the forming tool 24 the relay 200 is energized to stop advancing rotation of the motor 105 and reverse its direction of rotation as will now be described.

Energizing control relay 200 causes simultaneous closing of its normally open contacts 200A, 200B, and 200C. Closing of the contacts 200A energizes the control relay 184 to thereby start reversal of the motor 105 in the manner previously described in connection with the reversal which was achieved manually by actuation of the control button 192. Closing contacts 200B of the control relay 200 completes a circuit to the relay 200 through the normally closed contacts 202A of an adjustable timer 202. Closing normally open contacts 200C supplies power to the timer 202 whereupon the retracting action by the motor 105 is achieved for a predetermined amount of time as determined by the setting of the timer 202.

Once the desired retraction of the forming tool 24 has been achieved the timer 202 times out opening its contacts 202A and 202B, thereby breaking the circuit to the differential relay 200, which causes the normally open contacts 200A, 200B, and 200C to again open. Opening of contacts 200A and 202B causes the control relay 184 to be deenergized and retraction by the motor 105 is stopped.

The switch 177 is still closed after the forming tool 24 has been retracted the desired amount as determined by the time increment set in the timer 202 and the apparatus 20 is in condition for forward movement and such forward movement is easily started again by momentarily pushing the forward button 176 to start advancing the workpiece in the manner previously described. In this semiautomatic operation of the apparatus 20 the forward, i.e., drilling, action by the forming tool 24 is initiated in each instance (including, after automatic retract) by actuating button 176.

From the above description, it will be appreciated that the apparatus 20 is operated in a semiautomatic manner after a jamming condition by manually actuating the push button 192 after an automatic retract condition. However, the apparatus may be provided with an electrical circuit which enables fully automatic infeed after automatic retraction of the forming tool. The operation of the apparatus 20 with fully automatic retract and infeed will now be described in connection with certain optional components which may be provided and are shown by dotted lines in FIG. 7.

As mentioned previously, during jamming of the forming tool the electrical device 190 senses the increased current condition and energizes the differential relay 200 causing simultaneous closing of its contacts 200A, 200B, and 200C as before. However, it addition to the contacts 202A and 202B the timer 202 has normally open contacts 202C which are energized upon energizing of timer 202 and the contacts 202C act as a holding circuit for the timer 202 through normally closed contacts 186D of control relay 186. In addition, the timer 202 has contacts 202D in a circuit with the control relay 186 and the contacts 202D operate to close at the completion of the time cycle set on the timer 202.

During the retract cycle the timer 202 times out opening its contacts 202A and 202B which deenergize the relays 200 and 184 respectively. Deenergizing the relay 184 causes its normally open contacts 184C to again open to stop the motor 105 thus stopping retraction of the forming tool as previously described. As mentioned above, the timer 202 also has contacts 202D which operate to close immediately after the timer contacts 202A and 202B are opened, i.e., after completion of the timed retract cycle. Closing contacts 202D again energizes the relay 186 to start the forward feed automatically.

As the relay 186 is energized its normally closed contacts 186D are instantaneously opened to deenergize the timer 202 causing its normally open contacts 202C and 202D to again open thereby deactivating the entire timer circuit whereupon the timer is of a type which automatically resets itself. The infeed continues in the manner previously described until the proper depth has been reached by the forming tool or a jamming condition again repeats itself.

Thus, it is seen that the apparatus 20 may have suitable electrical components to allow substantially semiautomatic operation after a jamming condition or fully automatic operation after such a jamming condition.

From the illustration presented in FIG. 1, it will be seen that the control panel 167 is easily accessible to an operator to enable easy and efficient operation of such apparatus 20. Further, it will be seen that the selector valve 66, with its control lever 77, is arranged on the apparatus 20 at an easily accessible location and in close proximity to the control panel 167 whereupon it is not necessary to stop the pump 65 to stop the flow of abrasive slurry to the workpiece during the operation of the apparatus 20. To stop flow of such slurry it is merely necessary to move the lever 77 from one position to another in the manner previously described thereby enabling rapid movement of the apparatus 20 from one forming or drilling location to another yet the abrasive slurry is instantly available at all times.

Having described the component parts of the apparatus 20 in detail, a brief general description will now be made to highlight the simplicity with which such apparatus may be utilized in forming the associated workpiece 35. The apparatus 20 is of minimum weight and those components seen in perspective view in FIG. 1 may be constructed to weigh approximately 20 pounds. Thus, it will be appreciated that the apparatus 20 may be easily handled by one operator in a manner heretofore not possible using existing devices and easily installed in position on an associated fixture 51 merely by rotating the handles 145 in the manner previously described in detail.

With the apparatus 20 thus fastened in position on the fixtures 51 and over the workpiece 35, the buttons 168 and 169 are pushed to supply power to the apparatus 20 and start operation of the abrasive pump 65. The selector valve lever 77 is in its bypass condition whereby the abrasive slurry is merely circulated from the supply tank 64 to the valve 66 and back to the supply tank.

To start the forming operation the switch 175 is actuated followed by actuating the forward button 176 whereupon the forming tool 24 is ultrasonically oscillated against the workpiece and immediately upon pushing the forward button 176 the operator also actuates the lever 77 to provide abrasive slurry to the operating end 34 of the forming tool 24.

The switch 175 also has suitable contacts and electrical connections (not shown) which also energize both a coolant pump which provides cooling liquid to the transducer and an air pressure pump which provides air under pressure to the rotary actuator 106. These components and their operating fluids and electrical circuits may be of any suitable conventional form and connected so that once the switch 175 is opened these components will also be automatically turned off.

The indicator 152 provided on the apparatus 20 may be used during the forming action to provide an accurate reading of the amount of cutting that has taken place and may be read at a glance by the operator. Once the desired depth of cut has been reached the limit switch 177 is actuated stopping the infeed by the motor 105 and actuating a travel limit light 191. The forming tool is retracted manually by energizing the control button 192 to reverse the operation of the motor 105 causing the switch 171 to be activated and thereby stop the reverse rotation of the motor 105.

In the event there is a tendency for the forming tool to jam the forming action because it is feeding into the workpiece 35 too fast the automatic retraction means provided in the apparatus 20 causes automatic retraction of the forming tool 24 for a given time increment (in the manner previously described in detail) followed by either semi-automatic or automatic infeed, depending on the circuit used, until the forming action is complete.

Once the forming action is complete and the forming tool 24 has been retracted the lever 77 is returned to its bypass position, and switch 175 is turned off. The apparatus 20 may then be moved to another forming location and the operation repeated.

Thus, it will be appreciated that the forming tool is always maintained in a peak operating efficiency by preventing jamming thereof, the abrasive slurry is applied to the operating end of the forming tool with maximum delay by the unique use of the selector valve 66, and the amount of time that is utilized to automatically retract the forming tool 24 is kept at a minimum through the unique action of the timer 202 in the electrical circuit.

To assure a more efficient operation the timer 202 provides a minimum amount of automatic retraction of the forming tool 24 as determined by the timer setting. However, it would be a simple matter to eliminate the timer 202 and allow retraction until the upper limit switch 171 is actuated. Also, it will be appreciated that the push button switches 176 and 192 are of the momentary type which must be held closed to make contact and are spring loaded open.

The other switches provided on the apparatus 20, including the safety switch 185, may be of any suitable type. Further, the switch 185 is not shown on the control panel 167 in this example of the invention but may be placed on such control panel, if desired, or at any other easily accessible location on the apparatus 20. The switch 185 serves as a manual override safety switch which may be used to stop the motor 105 irrespective of whether the forming tool is moving toward or away from the workpiece by simultaneously opening its previously mentioned contacts 185A which are connected in a circuit with the control relay 186 as well as opening a set of contacts 185B connected in a circuit with the control relay 184.

Another exemplary embodiment of this invention is illustrated in FIG. 10 of the drawings. The apparatus illustrated in FIG. 10 is very similar to the apparatus 20; therefore, such apparatus will be designated generally by the numeral 20M and parts of apparatus 20M which are very similar to corresponding parts of apparatus 20 will be designated by the same numeral as apparatus 20 also followed by the letter designation M and not described again. Only those component parts which are substantially different from corresponding parts of apparatus 20 will be designated by a new numeral also followed by the letter designation M and described in detail. Further, it will be appreciated that the electrical circuitry shown in FIG. 7 also comprises the apparatus 20M.

Although the previously presented exemplary embodiment has been shown for use with a fixture attachment, it is apparent that the hand-portable apparatus may equally well be used without a fixture attachment. As shown in the exemplary embodiment of FIG. 10, the guide 30M has been modified to include a sealing element, such as O-ring 210M, which will engage and seal against workpiece 35. In this latter embodiment, the slurry travels through conduit 70M and through a flexible conduit section 211M to tool 24M and is fed downwardly therethrough by means of a passage 212M. The slurry is returned through passages 33M to conduit 74M which may be attached to a pump and reservoir as previously described to provide continuous recirculation of the slurry to and from the workpiece. Hence, in this embodiment, the operator holds the apparatus 20M in sealed engagement with the workpiece surrounding the work area against the same work surface into which the tool enters and moves from position to position when the desired holes have been formed.

The hand-portable apparatus of this invention is of minimum weight as previously mentioned and its fluid supply lines are lightweight lines which are readily flexible and enable easy movement of such apparatus from one forming location to another. Also, the apparatus is particularly effective in forming materials such as ceramic products, carbide products, glass, molybdenum, boron composites of tungsten substrate, and numerous other materials which are impossible to machine or form utilizing conventional techniques.

It will also be appreciated that the apparatus 20M has the upper ends of its passages 33M suitably connected to an annular groove or passage which is placed in flow communication with the return conduit 74M. With this arrangement it is also possible to hold the apparatus 20M so that it is substantially inverted from the position shown in FIG. 1, for apparatus 20, and yet form openings in a workpiece without loss of abrasive slurry.

While present exemplary embodiment of this invention have been illustrated and described, it will be recognized that this invention may be otherwise variously embodied and practiced within the scope of the following claims.

What is claimed is:

1. A hand-portable apparatus for forming a workpiece by oscillating a forming tool at high frequencies and minute amplitudes, said apparatus comprising, a housing, a magnetostrictive driving transducer supported within said housing, a toolholder fixed to said transducer and having said forming tool fastened thereto, a device supported by said housing and being adapted to operatively associate with said workpiece to supply an abrasive slurry to the operating end of said forming tool during forming of said workpiece, and conveying means for supplying said slurry to said device and away therefrom.

2. An apparatus as set forth in claim 1 wherein said device cooperates with an associated fixture supported against said workpiece at a forming location to supply said slurry to said operating end and further comprising attaching means for attaching said device against said fixture.

3. An apparatus as set forth in claim 1 in which said device comprises a guide fixed to said housing, said guide having an opening therein for receiving and guiding said toolholder for axial sliding movement and having a plurality of apertures extending therethrough approximately parallel to the central axis of said cutting tool, said apertures being adapted to convey said slurry toward and away from said operating end.

4. An apparatus as set forth in claim 1 in which said housing comprises a substantially tubular housing having a cup-like lower end portion serving as an intermediate reservoir for receiving said slurry from said conveying means and said device comprises a guide fixed to said cup-like lower end portion, said guide having an opening therein for receiving and guiding said toolholder for axial sliding movement therethrough, and aperture means extending through said guide approximately parallel to the central axis of said forming tool, said aperture means allowing said slurry to be gravity fed from said reservoir to said operating end and away from said operating end.

5. An apparatus as set forth in claim 4 in which said conveying means comprises, an easily movable supply conduit for supplying said slurry under pressure from a supply source to said reservoir, said supply conduit having its discharge end fastened to an in flow communication with said reservoir, a selector valve operatively connected in said supply conduit, a return conduit connected between said reservoir and said supply source for returning said slurry to said supply source after flowing said slurry past said operating end of said forming tool, and a bypass conduit connected between said selector valve and said return conduit, said selector valve being easily accessible on said housing and enables flow of said slurry to said reservoir to be stopped and returned to said supply source through said bypass conduit during those instances wherein said apparatus is shut off yet said slurry is substantially instantly available to said operating end upon starting said apparatus merely by actuating said selector valve to thereby enable said apparatus to be operated more efficiently.

6. An apparatus as set forth in claim 5 in which said return conduit has its inlet fastened to the upper end portion of said reservoir at a location spaced from said discharge end of said supply conduit to enable smooth flow of said slurry into said reservoir and around said operating end and then back to said supply source.

7. An apparatus as set forth in claim 1 in which said transducer and toolholder are supported for axial sliding movement relative to said housing and further comprising feed means for moving said transducer and said toolholder outwardly from said housing toward said workpiece.

8. An apparatus as set forth in claim 7 in which said feed means comprises means moving said transducer and toolholder about a central axis through said toolholder during the outward moving of said transducer and toolholder to prevent jamming of said forming tool in said workpiece and thereby improve the forming efficiency of said forming tool.

9. An apparatus as set forth in claim 8 in which said moving means comprises a rotary actuator for oscillating said transducer and toolholder through a predetermined arc.

10. An apparatus as set forth in claim 1 and further comprising means for cooling said transducer during operation thereof.

11. An apparatus as set forth in claim 1 in which said housing comprises a cylindrical outer housing and further comprising, a cylindrical sleeve supported for axial movement within said housing, a carrier slidably supported for axial movement within said sleeve and having a central fluid-receiving chamber provided therein, said transducer being mounted within said chamber with a portion thereof extending outwardly therefrom while providing a fluid-tight seal between said portion and said carrier, feed means for moving said carrier and hence said transducer and toolholder outwardly from said sleeve and housing toward said workpiece, and means for cooling said transducer during operation thereof by flowing a cooling fluid into said chamber and around said transducer.

12. An apparatus as set forth in claim 11 in which said cooling means comprises a flexible fluid supply line fastened in flow communication with said chamber and being adapted to convey a cooling fluid to said chamber to surround said transducer, a flexible return line fastened in flow communication with said chamber and being adapted to convey said cooling fluid away from said chamber, and pump means for pumping said cooling fluid through said supply line into said chamber and away from said chamber after flowing past said transducer to enable efficient cooling thereof.

13. A hand-portable apparatus for forming a workpiece by oscillating a forming tool at high frequencies and minute amplitudes, said apparatus comprising, a housing, a magnetostrictive driving transducer supported within said housing, a toolholder fixed to said transducer and having said forming tool fastened thereto, a device supported by said housing and being adapted to operatively associated with said workpiece to supply an abrasive slurry to the operating end of said forming tool during forming of said workpiece, conveying means for supplying said slurry to said device and away therefrom, and feed means for moving said transducer and forming tool away from said housing and urging said forming tool against said workpiece with a controlled force.

14. An apparatus as set forth in claim 13 and further comprising a visual indicator for indicating the amount said forming tool is extended into said workpiece after commencement of the forming action.

15. An apparatus as set forth in claim 13 and further comprising electrical control means for controlling said feed means and hence the feeding of said forming tool into said workpiece and thereby assure an efficient forming action.

16. An apparatus as set forth in claim 13 in which said housing comprises a cylindrical outer housing and further comprising; a cylindrical sleeve supported for axial movement within said housing; a carrier slidably supported within said sleeve and having a central coolant-receiving chamber provided therein, said transducer being mounted within said chamber with a portion thereof extending outwardly therefrom with a tight seal being provided between said portion and said carrier; and said feed means comprises, an electrical motor fixed to said sleeve and having a rotatable shaft extending therefrom, a first threaded member fixed to said shaft for rotation therewith, and a second threaded member operatively connected to said carrier and held against complete rotation relative to said sleeve so that upon energizing said motor said first threaded member is threaded relative to said second threaded member to thereby axially move said carrier and forming tool relative to said housing and sleeve and toward said workpiece.

17. An apparatus as set forth in claim 16 and further comprising electrical control means for controlling the feeding of said forming tool into said workpiece by said feed means, said control means comprising means for detecting an electrical condition indicating a tendency of said forming tool to jam, and means for automatically reversing said electrical motor and hence said rotatable shaft to automatically retract said forming tool and enable the forming action of said forming tool to be started again.

18. An apparatus as set forth in claim 17 in which said feed means comprises means for moving said transducer and toolholder about a central axis through said toolholder during the outward movement thereof to improve the forming efficiency of said forming tool.

19. An apparatus as set forth in claim 17 in which said control means further comprises an adjustable timer for controlling the time increment that said electric motor is reversed to assure forming using said forming tool is achieved with minimum time delay.

20. An apparatus as set forth in claim 17 and further comprising fully automatic means for automatically restarting the forming action following automatic retraction of the forming tool.

21. A portable apparatus for forming a workpiece by oscillating a forming tool at high frequencies and minute amplitudes, said apparatus comprising, a housing, means at one end of said housing for sealed association with the workpiece surface about the area to be formed, a high frequency driving transducer, a toolholder fixed to said transducer and having said forming tool fastened thereto, support means carrying said transducer for movement relative to said housing and feeding projection of said tool to the forming area, means cooperating between said housing and transducer for feeding movement of said tool irrespective of the orientation of said housing, and means within said one end of said housing for supplying an abrasive slurry to the operating end of said forming tool during forming of said workpiece and removing said slurry therefrom.

References Cited

UNITED STATES PATENTS

| | | | |
|---|---|---|---|
| 3,482,360 | 12/1969 | Legge | 51—59 SS |
| 2,942,383 | 6/1960 | Brown et al. | 51—59 SS |
| 3,213,537 | 10/1965 | Balamuth et al. | 51—263 X |
| 2,991,594 | 7/1961 | Brown et al. | 51—59 SS |

JAMES L. JONES Jr., Primary Examiner

U.S. Cl. X.R.

51—263